(12) United States Patent
Kelly, Jr. et al.

(10) Patent No.: US 6,546,892 B2
(45) Date of Patent: Apr. 15, 2003

(54) OVERHEATING AXLE WARNING DEVICE

(76) Inventors: Walter P. Kelly, Jr., 652 Hillcrest Loop, Petal, MS (US) 39465; Kent E. Lacina, 316 Dobson Rd., Purvis, MS (US) 39475

( * ) Notice: Subject to any disclaimer, the term of this patent is extended or adjusted under 35 U.S.C. 154(b) by 0 days.

(21) Appl. No.: 09/874,973

(22) Filed: Jun. 7, 2001

(65) Prior Publication Data

US 2002/0185052 A1 Dec. 12, 2002

(51) Int. Cl.[7] ............................................. B60B 35/00
(52) U.S. Cl. ..................... 116/216; 116/217; 301/108.2
(58) Field of Search ..................... 116/216, 217, 116/218, 219, 101; 374/142, 143, 195, 187, 190, 120; 301/108.1, 108.2

(56) References Cited

U.S. PATENT DOCUMENTS

| | | | |
|---|---|---|---|
| 2,694,997 A | * 11/1954 | Alger, Jr. ..................... 116/106 |
| 3,331,638 A | * 7/1967 | Fruth ......................... 301/108.2 |
| 3,401,666 A | 9/1968 | Munroe |
| 3,569,695 A | * 3/1971 | McLean ................. 246/169 D |
| 3,926,053 A | * 12/1975 | Schurrer et al. .............. 73/351 |
| 4,119,284 A | 10/1978 | Belmont |
| 4,748,931 A | 6/1988 | Volk |
| 4,818,119 A | 4/1989 | Busch et al. |
| 4,947,786 A | 8/1990 | Maynard et al. |
| 5,046,447 A | 9/1991 | Steinke et al. |
| 5,315,954 A | 5/1994 | Richmond |
| 5,482,358 A | 1/1996 | Kuck |
| 5,487,352 A | 1/1996 | Williams et al. |
| 5,718,633 A | 2/1998 | Gehrke |
| 5,799,606 A | 9/1998 | Volk et al. |
| 5,813,433 A | * 9/1998 | Oswaks et al. ............. 137/553 |
| 5,988,102 A | 11/1999 | Volk et al. |
| 6,095,081 A | * 8/2000 | Gochenour ................. 116/209 |
| 6,203,114 B1 | * 3/2001 | Ehrlich ..................... 301/124.1 |

FOREIGN PATENT DOCUMENTS

| | | |
|---|---|---|
| DE | 32 29 020 A1 | 2/1984 |
| GB | 1 245 249 | 9/1971 |
| SU | 640144 | 2/1979 |

* cited by examiner

*Primary Examiner*—Diego Gutierrez
*Assistant Examiner*—Tania C. Courson
(74) *Attorney, Agent, or Firm*—Richard C. Litman

(57) ABSTRACT

An overheating axle warning device comprising a heat sensor device with a neoprene seal which is substituted for a standard rubber filler wheel hub plug. The device can have various colors to identify certain temperature ranges of activation.

4 Claims, 4 Drawing Sheets

OVERHEATING AXLE WARNING DEVICE

BACKGROUND OF THE INVENTION

1. Field of the Invention

The present invention relates generally to indicator devices. More specifically, the invention is an overheating axle warning device which replaces the standard rubber filler wheel hub plug on an axle end cap for large over-the-road vehicles.

2. Description of the Related Art

The related art of interest describes various warning devices, but none discloses the present invention. There is a need for an axle overheating sensor device which can be readily installed in a modified axle end cap. When the wheel bearings lock up due to excessive buildup of heat, a repair can cost as much as $1,000.00 per wheel, which can become prohibitively expensive for an eighteen wheel truck. The device of the present invention can be color coded for specific heat temperature limits. The related art will be discussed in the order of perceived relevance to the present invention.

U.S. Pat. No. 4,947,786 issued on Aug. 14, 1990, to Raymond L. Maynard et al. describes an overheated-axle indicator device comprising a heat responsive gauge having a plunger half positioned in a tubular fitting or sleeve in an opening in the plug. The other half of the gauge consists of a fusible link and a spring-loaded button housed in a tubular housing having a front wall attached to a magnetic disk and a conical housing member either embedded in a solid axle or equipped with a pair of flexible prongs based on an additional annular plate to fit a hollow axle. The halves are not connected and have a critical space between them. A vent hole 49 in FIG. 3 is necessary. The devices are distinguishable for requiring two spaced parts and the addition of a sleeve and a vent hole in the centrally open plug.

U.S. Pat. No. 5,482,358 issued on Jan. 9, 1996, to Scott M. Kuck describes a vented plug for a hubcap comprising a rubber plug having a flanged insert molded therein which prevents water and other contaminants from entering the hubcap, but which permits the passage of air therethrough so that excessive pressure within the hubcap may be vented. The vented plug is distinguishable for its molded flanged insert.

U.S. Pat. No. 5,988,102 issued on Nov. 23, 1999; U.S. Pat. No. 5,799,606 issued on Sep. 1, 1998; and U.S. Pat. No. 4,748,931 issued on Jun. 7, 1988, to Steven J. Volk et al. describes a pop-up temperature indicating device for use in cooking foods such as meat and poultry. The devices are used only for cooking foods.

U.S. Pat. No. 5,487,352 issued on Jan. 30, 1996, to John R. Williams et al. describes a temperature indicator for cooked meats. The device is distinguishable for use only for cooking meat.

U.S. Pat. No. 3,401,666 issued on Sep. 17, 1968, to William O. Munroe describes a temperature detecting actuator device for bearings comprising a pair of temperature sensing and spring actuated parts which are telescopically mounted for sliding engagement of their opposed walls. A thin film of fusible material is bonded between the walls. The device is distinguishable for its multiple springs.

U.S. Pat. No. 4,818,119 issued on Apr. 4, 1989, to Theodore Busch et al. describes a hot bearing warning bolt comprising an axially extending bore into which a heat responsive element, a driver, and a sensing indicator are arranged. The bore is sealed by a closure plug. Upon reaching the preselected upper temperature, the element exerts a force against the driver which removes the closure plug and exposes the indicator. The device is distinguishable for its bolt structure.

U.S. Pat. No. 5,046,447 issued on Sep. 10, 1991, to Karl O. Steinke et al. describes a temperature limit indicator device for a fluid conduit comprising a housing mounted on a conduit and containing a spring encased cup-shaped indicator in fusible material which melts and releases the indicator. The device is distinguishable for its limitation to the application of fluids in a conduit.

U.S. Pat. No. 4,119,284 issued on Oct. 10, 1978, to Norman J. Belmont describes a railroad hotbox indicator device comprising a housing attachable to the wheel and axle assembly of a railway car. The device releases a streamer when abnormal temperatures are reached by means of a fusible retainer which releases a stem of an ejector assembly, the streamer being attached to the stem. The device is distinguishable for its required streamer assembly.

U.S. Pat. No. 5,315,954 issued on May 31, 1994, to Allan Richmond describes a hot bearing alarm device comprising a thermally activated engagement element inserted adjacent to a rotatable shaft and bearings of a driveless idler roller for moving a belt. The device is distinguishable for its limitation to a driveless idler roller.

U.S. Pat. No. 5,718,633 issued on Feb. 17, 1998, to Glenn F. Gehrke describes a universal joint wear indicator device which operates so that a plug melts to release the indicator in the universal joint. The device is distinguishable for being limited to a universal joint.

U.K. Patent Application No. 1 245 249 published on Sep. 8, 1971, for Joseph A. Pope describes an electronic temperature responsive device for moving parts, such as an oscillation damper for a crankshaft of large internal combustion engines. The device is distinguishable for requiring electronic means.

Soviet Union Patent Application No. 640144 published on Feb. 20, 1979, for Khark Railway Trans. describes a temperature limit indicator inside an axle box of a railway freight car to provide a visual warning signal when the axle overheats. The device is limited to railway axle boxes.

Germany Patent Application No. DE 32 29 020 A1 published on Feb. 9, 1984, for Karl T. Kaiser et al. describes a device for displaying an excessive temperature of an electrical conductor in the region of a connection between conductors of a high voltage system. The device has a housing for a base rod connected to the capped extension rod and encircled by a spring and a fusible element. The device is distinguishable for its restricted application to electrical conductors.

None of the above inventions and patents, taken either singularly or in combination, is seen to describe the instant invention as claimed. Thus, a overheating axle warning device solving the aforementioned problems is desired.

SUMMARY OF THE INVENTION

The present invention is directed to an overheating axle warning device having a heat sensor element inserted into an apertured rubber seal element which is substituted for the standard rubber filler wheel hub plug. The device can have various colors to identify certain temperature ranges of activation and various sizes of the seal element to fit snugly any size wheel hub opening.

Accordingly, it is a principal object of the invention to provide a device and a method of using the device for detecting overheating of a truck wheel axle.

It is another object of the invention to provide a heat sensor device combined with a flexible hub cap for a truck wheel axle.

It is a further object of the invention to provide a pop-up heat sensor with a flexible hub cap for a truck wheel axle.

Still another object of the invention is to provide a color coded heat sensor device and a flexible hub cap for any truck wheel axle hub's opening.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
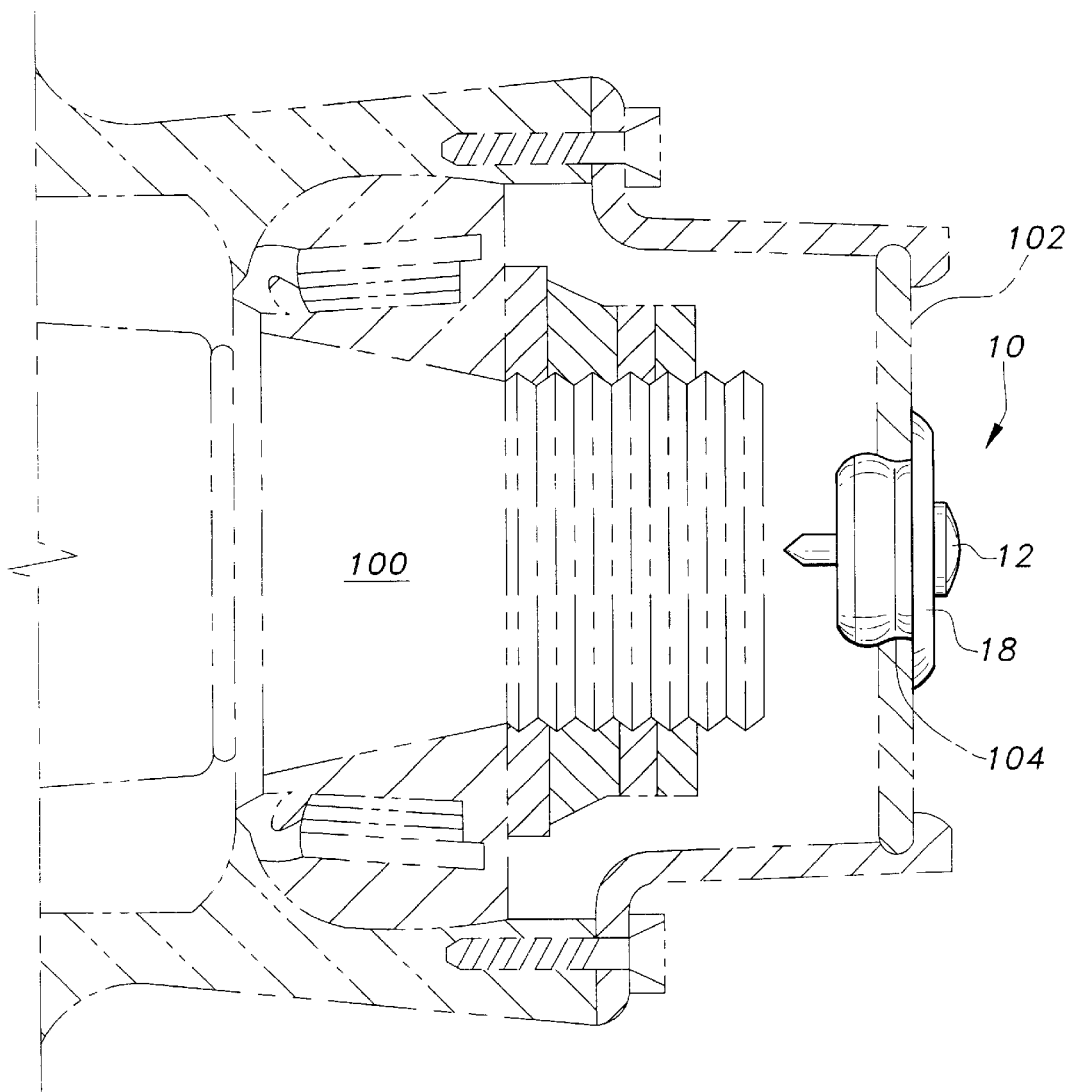
FIG. 1 is an environmental view of an overheating axle warning device according to the present invention inserted in a vehicle axle.
Figure 2:
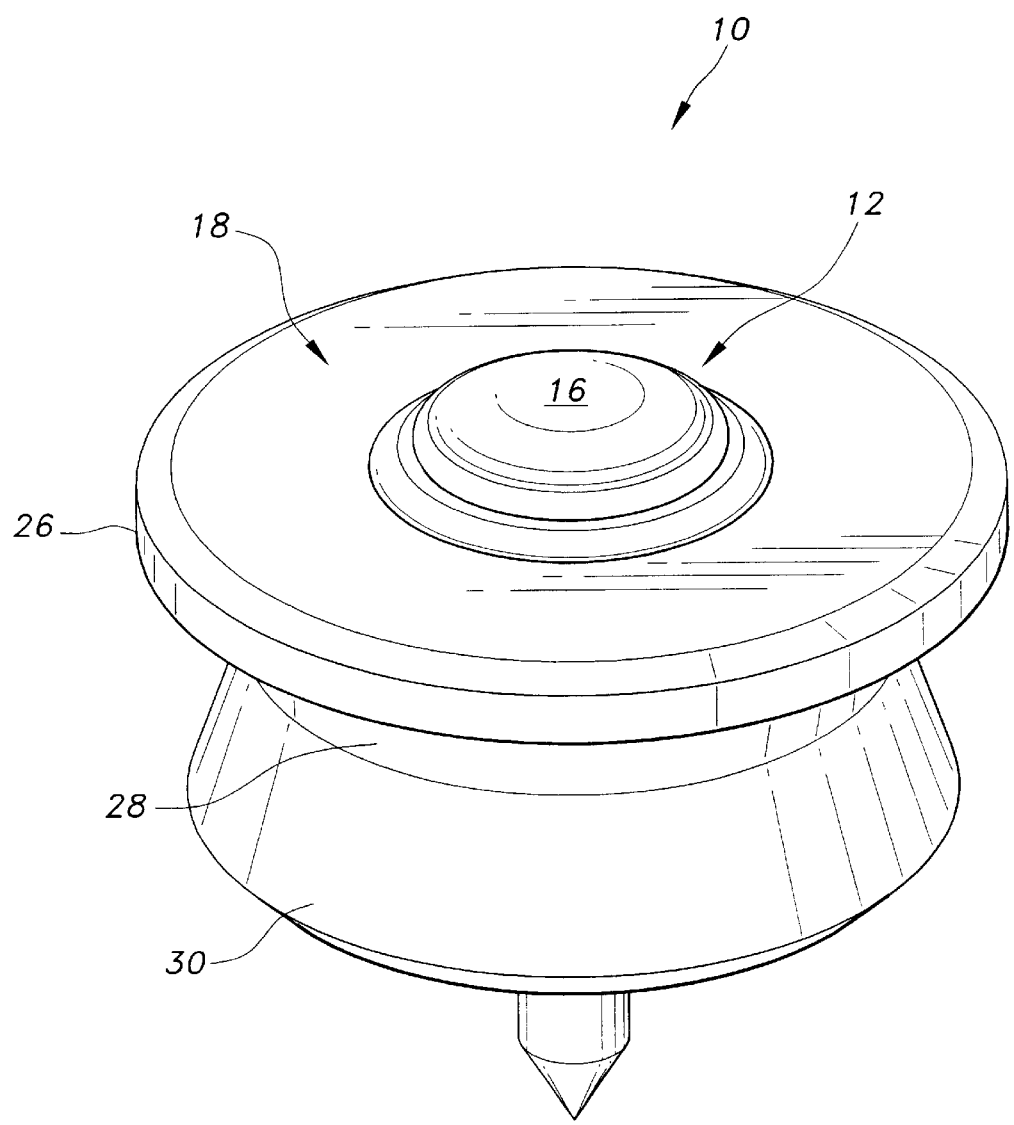
FIG. 2 is a perspective view of the device of the present invention in a closed position.
Figure 3:
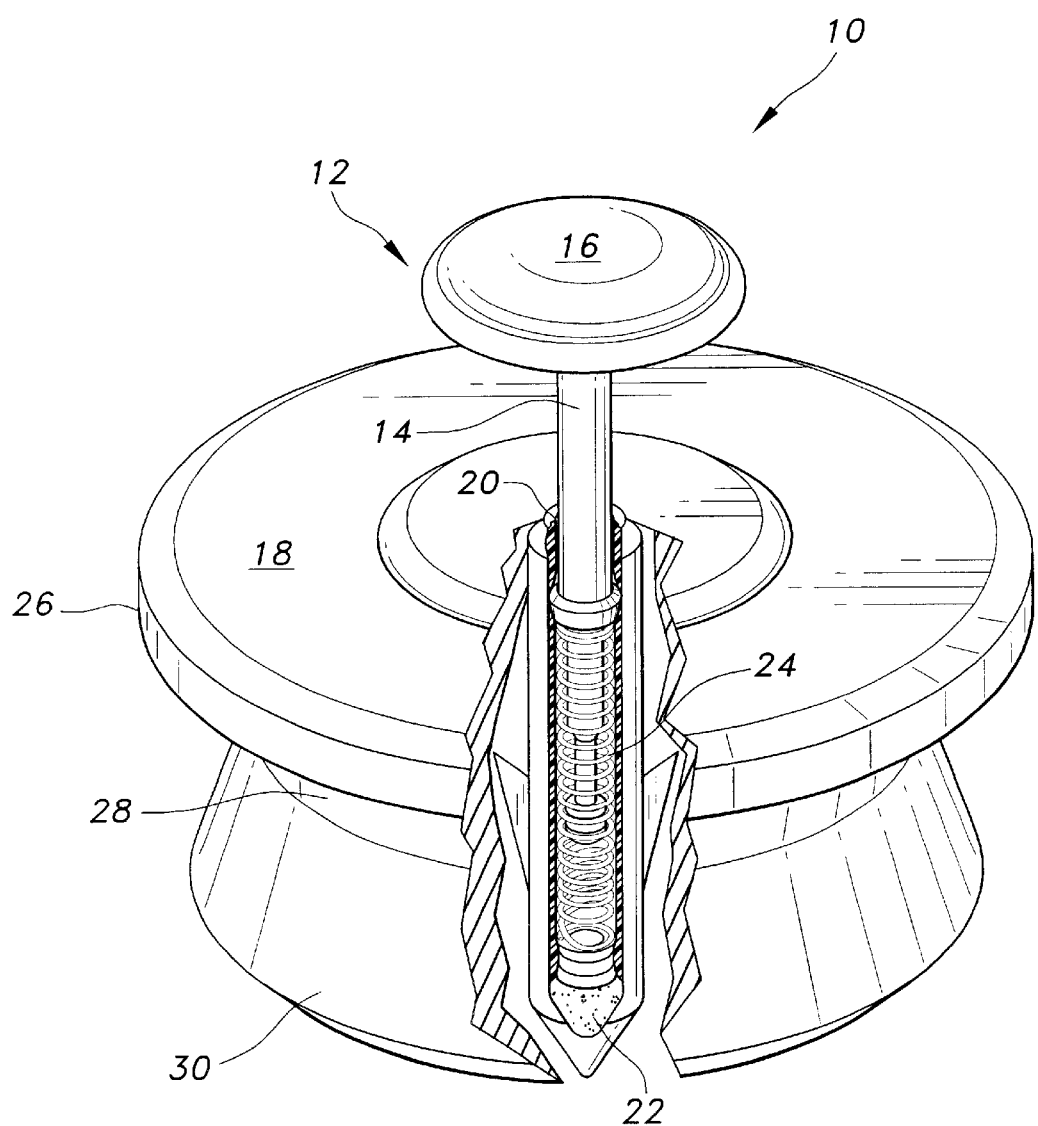
FIG. 3 is a perspective view of the device of the present invention in an open position with parts broken away.
Figure 4:
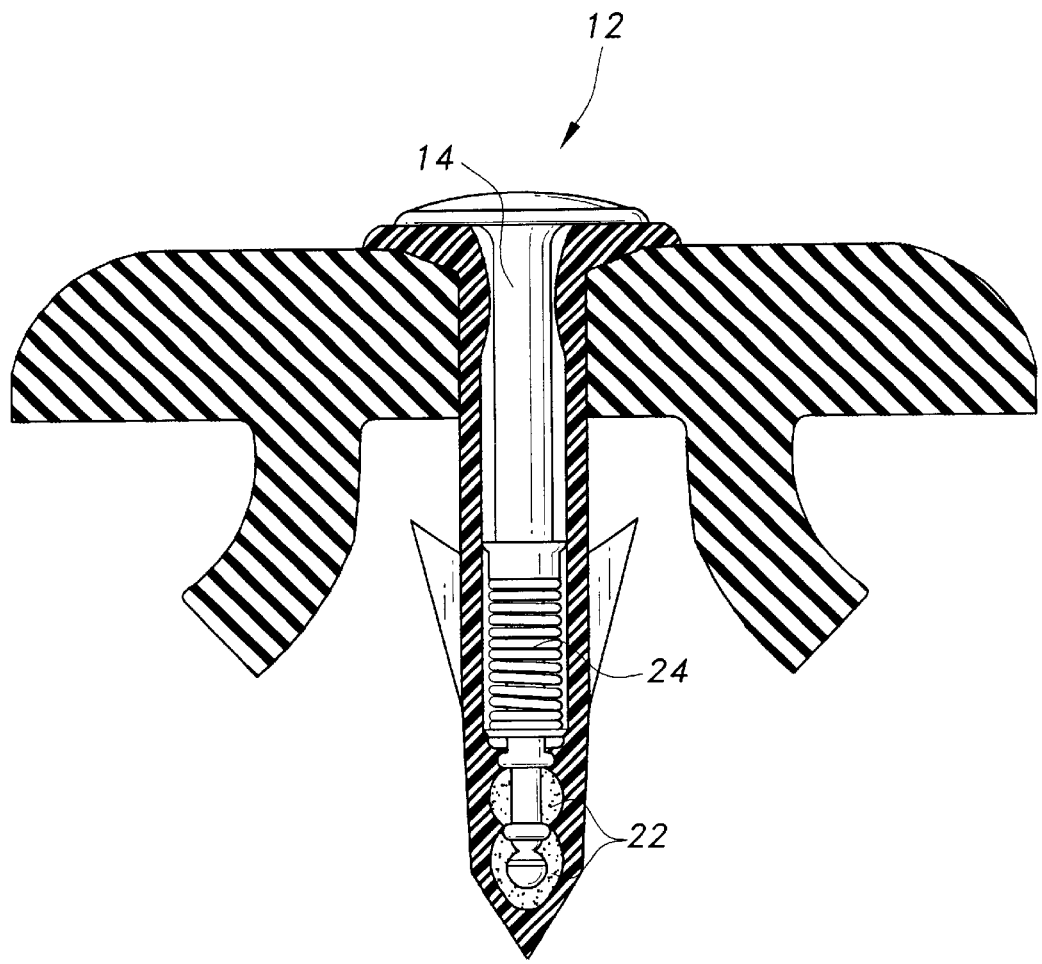
FIG. 4 is a partially sectioned side elevation view of a conventional overheating warning device with a pop-up feature.

The present invention is directed in FIGS. 1, 2 and 3 to an overheating axle warning device 10. FIG. 1 shows the device 10 inserted into a hubcap opening 104 a hubcap 102. The device 10 is spaced from an end of axle 100 of a multi-axle truck. The device 10 includes a conventional pop-up temperature indicating element 12, such as the device of U.S. Pat. No. 5,988,102, which is hereby incorporated by reference, and particularly as depicted in FIG. 4 of the present application, having a specified temperature limit, a pop-up stem 14 and a cap 16 as one part of the device 10. As shown in FIGS. 1–3, a rubber or neoprene hubcap seal element 18 having a centered aperture 20 forms the remaining part of the device 10, with the pop-up temperature indicating device 12 inserted into aperture 20 to form a friction fit with the flexible hubcap seal element 18. It should be noted that the hubcap seal element 18 must be sized and dimensioned for insertion into the same hubcap aperture normally occupied by the standard rubber filler plug being replaced. Therefore, the device 10 is supplied to the user as a combination of the temperature indicating element 12 and the hubcap seal element 18.

In FIG. 3, a pop-up cap 16 extends outward when the specified temperature limit is exceeded by the melting of the fusible material 22, releasing the cap stem and expanding the spring 24 to pop-up the cap to an open position to warn a truck driver at a rest stop area that a predetermined wheel axle temperature has been exceeded. The apertured flexible seal element 18, preferably made of neoprene, has a top flanged portion 26, a neck portion 28, and an inverted cup portion 30.

The pop-up cap 16 can be color-coded to indicate a specific temperature range in order to custom fit the device 10 to a vehicle and the current temperature range of the trip environment. Therefore, a kit containing a variety of devices 10 with different temperature range requirements can be supplied to the driver for his selection.

It should be noted that the internal end of the pop-up element 12 must not touch any internal part of the hubcap and axle, because of extraneous heat transmitted to the pop-up element.

It is to be understood that the present invention is not limited to the embodiment described above, but encompasses any and all embodiments within the scope of the following claims.

We claim:

1. An overheating axle warning assembly comprising:
    an axle of a multi-axle truck, said axle longitudinally extending along an axis and having an end;
    a hubcap having an opening adapted to receive a filler plug of the multi-axle truck, said hubcap being mounted about the end of the axle, wherein a center of the opening is generally aligned with the longitudinally extending axis and is spaced from the end of the axle; and
    an overheating axle warning device comprising:
        a pop-up temperature indicating element having a specified temperature limit, a pop-up stem, a cap, and a temperature sensitive end, said pop-up temperature indicating element being color coded to indicate a specific temperature limit; and
        a flexible hubcap seal element having a centered aperture, the pop-up temperature indicating element being inserted into the centered aperture of said flexible hubcap seal element, said hubcap seal element being inserted into the hubcap opening such that the temperature sensitive end of the pop-up temperature indicating element is generally aligned with the longitudinally extending axis of the axle and is spaced from the end of the axle;
    wherein the cap extends outward when the specified temperature limit is exceeded in order to warn a truck driver that a predetermined wheel axle temperature has been exceeded.

2. The overheating axle warning assembly according to claim 1, wherein said hubcap seal element is made of neoprene.

3. A method of warning a truck driver that a truck's wheel bearings have overheated, the method comprising:
    providing an axle of a multi-axle truck, the axle longitudinally extending along an axis and having an end;
    providing a hubcap having an opening adapted to receive a filler plug of the multi-axle truck;
    mounting the hubcap about the end of the axle, wherein a center of the opening is generally aligned with the longitudinally extending axis and is spaced from the end of the axle; and
    providing a pop-up temperature indicating element having a specified temperature limit, a pop-up stem cap disposed in a centered aperture of a flexible hubcap seal element, a cap, and a temperature sensitive end, the pop-up temperature indicating element being color coded to indicate a specific temperature limit;
    providing a flexible hubcap seal element having a centered aperture;
    inserting the pop-up temperature indicating element in the centered aperture of the hubcap seal element;
    replacing a fill plug in the hubcap opening with the hubcap seal element and the inserted pop-up temperature indicating element such that the temperature sensitive end of the pop-up temperature indicating element is generally aligned with the longitudinally extending axis of the axle and is spaced from the end of the axle; and periodically observing the pop-up temperature indicating element to observe whether the cap has extended outward in order to warn the truck driver that a predetermined wheel axle temperature has been exceeded.

4. The method according to claim 3, wherein said step of providing a flexible hubcap seal element further comprises making the seal element of neoprene.

* * * * *